April 9, 1940.   R. W. LUCE   2,196,637
LOCK NUT
Filed Oct. 7, 1937
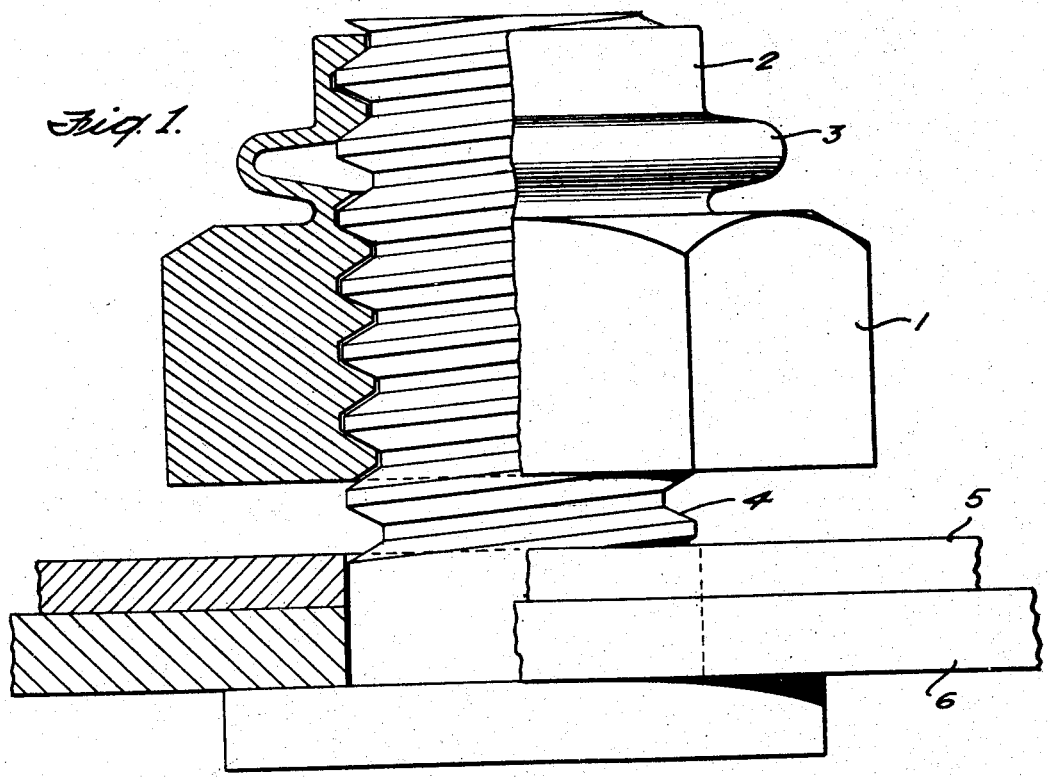
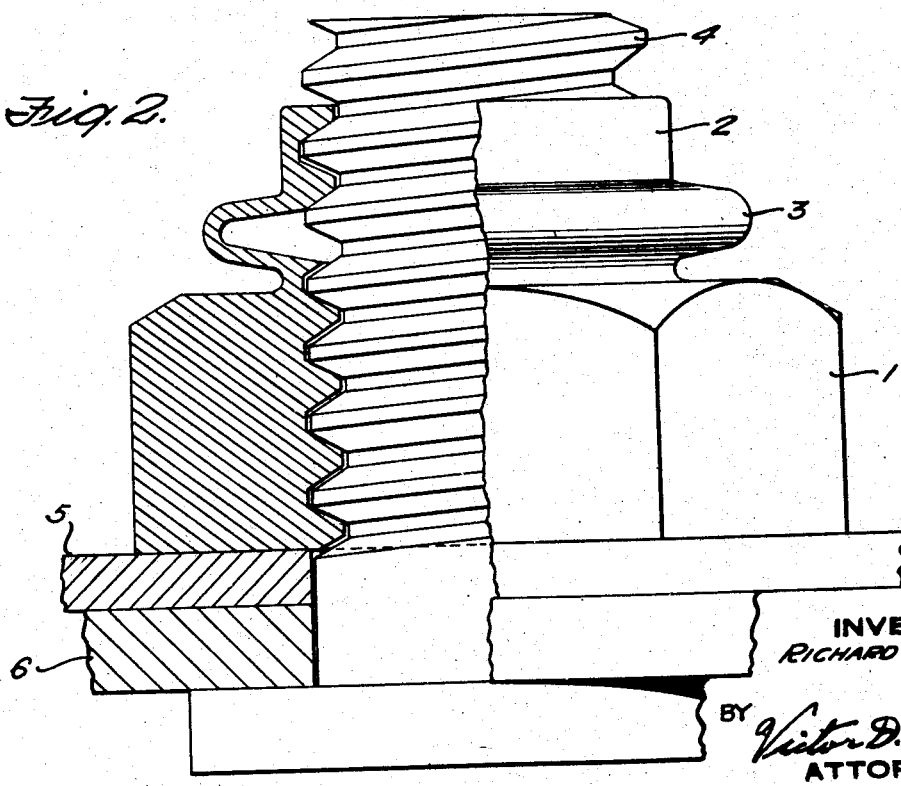
INVENTOR
RICHARD W. LUCE
BY
ATTORNEY Patented Apr. 9, 1940

2,196,637

UNITED STATES PATENT OFFICE 2,196,637

LOCK NUT

Richard W. Luce, Westfield, N. J.

Application October 7, 1937, Serial No. 167,757

6 Claims. (Cl. 151—21)

The invention herein disclosed relates to a lock nut; that is to say, a nut that so engages a bolt that it will not loosen on the bolt by virtue of the vibrations and shock encountered in machines, vehicles and other structures.

It is a well known fact that if the threads of a nut and bolt are accurately formed, such that there is accurate and close contact between all of the surface of the threads of the nut with the threads of the bolt, the frictional force between the surfaces of the threads is sufficient to resist forces due to vibrations or shock and tending to displace the nut on the bolt. However, for commercial purposes particularly, it is impractical to make nuts and bolts with such accuracy. The threads of commercial nuts and bolts have considerable dimensional variations and the ordinary nut is readily loosened on a bolt, after once having been tightened thereon, by the forces exerted due to vibration and shock.

To overcome this difficulty various forms of so-called lock nuts have been proposed. In general, these lock nuts are so constructed that they engage the bolt with a clamping action. In some instances this clamping action is obtained by causing some portion of the nut to assume a permanent, non-resilient set out of line with the rest of the nut, and in others by some auxiliary clamping device such as a fibrous washer. Of the former kind there are two types, one in which the nut is distorted axially and the other in which the nut is distorted radially; the distorted portion in this latter type being in some instances somewhat resilient. In the axially distorted type there is a tendency for the threads to score as the nut is threaded on a bolt and frequently as the nut passes over one portion of the bolt it is, due to the variation in the threads, distorted in a direction opposite to its initial distortion so that it is free on another portion of the bolt. Furthermore, while such a nut may effect a locking action with the bolt on which it is threaded, it may be loose if removed and placed on another bolt. A satisfactory lock nut should be interchangeable.

Those lock nuts having a radially resilient distorted portion, commonly formed either by slotting a thin walled portion of the nut radially and then distorting the wall or radially displacing circumferentially spaced sections of a portion of the nut of reduced wall thickness, tend to axially and radially center the threads of the nut and bolt upon which the nut is threaded. Thus, the effect is to prevent contact between the greater portion of the threads of the nut and the threads of the bolt and so reduce the frictional force between the body of the nut and bolt.

The more successful lock nut heretofore made, particularly in the smaller sizes, is that which employs a fibrous washer assembled in the nut. The washer has an internal diameter somewhat less than the outside diameter of the threads of the bolt. Upon being threaded on a bolt, the bolt embosses the threads in the washer and the washer acts somewhat in the nature of a brake. While such lock nuts are initially satisfactory in certain instances, they lose their effectiveness when the fibrous washer becomes dry, hard and brittle. For this reason they are not suitable when subjected to the drying action of high temperatures.

By the invention described herein, there is provided a lock nut which depends for its locking action upon setting up and maintaining a frictional force between the surface of the threads of the nut and the surface of the threads of the bolt regardless of dimensional variations in the threads of either the nut or bolt. This lock nut, interchangeable with any number of bolts, is made entirely of metal, preferably of one piece construction, capable of manipulation in combination with a bolt without damage to the threads; it is economical to manufacture; and it is capable of resisting the effects of the elements encountered in service, such as oxidation, high temperature, etc. The locking force is exerted axially and in the same direction as the force exerted by drawing the nut tightly in position. There is thus provided a force between the threads that effects a locking action between the nut and bolt capable of withstanding any force tending to twist the nut on the bolt by virtue of the vibration, shock, etc., that is ordinarily encountered in service. This locking action is maintained regardless of the position of the nut on the bolt.

Such a lock nut, made in accordance with this invention, is disclosed in the accompanying drawing in which:

Fig. 1 is a section showing the nut on a bolt but not drawn up tight against a plate;

Fig. 2 is a like section showing the nut drawn up against a plate.

The lock nut shown in the drawing consists essentially of a body portion 1 that engages the threads of a bolt and a means for applying a resilient force to effect a forcible contact between the surface of the threads of the nut and the surface of the threads of a bolt upon which the nut is mounted. The nut is preferably, although not necessarily, made from a single piece of metal of hexagonal section and includes the body portion 1, an internally threaded portion or extension 2 spaced from one end of the body portion and connected thereto by an intervening, axially resilient portion 3. The portion 2 is tapped with the same tap and at the same time as the body portion 1, but it is subsequently axially displaced with respect to the body portion to an extent somewhat greater than the maximum possible axial play between the threads of the nut and any bolt upon which it may be placed, which is always less than half the pitch of the thread, preferably in a direction towards the body portion, so that the threads of the portion 2 are out of phase with the threads of the body portion.

The resilient portion 3 of the nut is such that the internal diameter thereof is greater than the external diameter of the extension 2, and the thickness of the wall of the resilient portion 3 is substantially uniform and less than the thickness including the threads of any tapped portion of the nut and preferably less than one half the difference between the internal diameter of the resilient portion 3 and the external diameter of the extension 2. In this way the maximum resiliency in a direction axially of the nut is obtained in the resilient portion 3. When the portions 1 and 3 are urged apart, as, for example, when the nut is threaded on a bolt, the resiliency of the portion 3 is exerted as a bending action and thus it has a greater range of movement before taking a set than any purely tension or compression action. Its action is such that irrespective of the tolerances in the threads of a nut and bolt it will be sufficient to effect a pressure contact at all times between the threads of the nut and the bolt upon which it is threaded.

When the nut is threaded on a bolt 4, the resilient portion 3 is expanded within the limits of its resiliency and without damage to the threads of either the bolt or nut, by virtue of the out-of-phase relation of the threads in the portion 2 with respect to the body portion 1. This causes the body portion 1 to be drawn axially in the direction of the extension 2 and brings the surface of the threads of the body portion into contact with the threads of the bolt, as clearly shown in the drawing. The threads of the bolt and nut are so maintained in pressure contact by the force exerted by the resilient portion 3 of the nut. A frictional force is thus set up primarily between the surfaces of the threads of the body portion of the nut and the threads of the bolt that is of sufficient magnitude to resist any movement of the nut on the bolt by virtue of shock or vibration. It will be apparent that this force will likewise take up any change in the character of the surfaces either by corrosion or shrinkage. Furthermore, due to the resiliency of the portion 3, the nut remains effective as a lock nut even though it is removed from the bolt and replaced or assembled upon another bolt.

In the drawing, the nut is illustrated as securing two plates 5 and 6 on the bolt 4. In Figure 1, the nut is shown spaced from the plates and in Figure 2 it is shown as drawn up against the plates. By comparing Figure 1 and Figure 2, it will be seen that the locking force exerted by the resilient portion 3 is in the same direction as the force exerted on the nut by drawing the nut up tightly against the plates. This is a material advantage as the two forces act in conjunction and not in opposition.

The nut disclosed may be made in many different ways. It may, for example, be made from hexagonal stock, on a screw machine, the resilient section 3 being formed on the screw machine by an undercutting tool and an external forming tool. The blank thus formed is tapped, the body portion 1 and the extension 2 being tapped simultaneously. The nut is then compressed such that the resilient portion 3 takes a set with the threads in the extension 2 out of phase with those in the body portion 1. Similarly, a hexagonal blank having a cylindrical extension of an external diameter equal to the ultimate external diameter of the section 2 may be used. This blank is bored axially and the extension upset by axial pressure to form a bulge. The wall of the bulge is then thinned with an external forming tool and the blank is tapped and set as previously described.

It will be obvious that various changes may be made by those skilled in the art in the details of the embodiment of the invention illustrated in the drawing and described above within the principle and scope of the invention as expressed in the appended claims.

I claim:

1. A lock nut of the type described comprising in combination three portions including two axially spaced tapped portions having similar threads, and a resilient portion intermediate the tapped portions and normally holding the tapped portions with the threads thereof out of phase, the resilient portion being axially expansible and disposed about the axis to provide a substantially uniform axial resiliency and including wall sections arranged to partake of a bending action upon axial expansion and contraction of the resilient portion, the wall section of the resilient portion being characterized by the metal thereof being less than that required for a complete threaded portion.

2. A lock nut of the type described comprising in combination three portions including two axially spaced tapped portions having similar threads, and a resilient portion intermediate the tapped portions and normally holding the tapped portions with the threads thereof out of phase, the resilient portion being axially expansible and disposed about the axis to provide a substantially uniform axial resiliency and including integral axially displaced wall sections arranged to partake of a bending action upon axial expansion and contraction of the resilient portion, the wall section of the resilient portion being characterized by the metal thereof being less than that required for a complete threaded portion.

3. A lock nut of the type described comprising in combination three portions including two axially spaced tapped portions having similar threads and a resilient portion intermediate the tapped portions and normally holding the tapped portions with the threads thereof out of phase, the resilient portion being axially expansible and disposed about the axis to provide a substantially uniform axial resiliency and including integral axially spaced outwardly extending wall sections and an arcuate wall section at the outer end of the outwardly extending wall sections, the wall sections being arranged to partake of a bending action upon axial expansion and contraction of the resilient portion and characterized by the metal thereof being less than that required for a complete threaded portion.

4. A lock nut of the type described comprising in combination three portions including two axially spaced tapped portions having similar threads, and an internally recessed portion forming a resilient portion intermediate the tapped portions and normally holding the tapped portions with the threads thereof out of phase, the resilient portion being axially expansible and disposed about the axis to provide a substantially uniform axial resiliency and including wall sections arranged to partake of a bending action upon axial expansion and contraction of the resilient portion, the wall section of the resilient portion being characterized by the metal thereof being less than that required for a complete threaded portion.

5. A lock nut of the type described comprising in combination three portions including two axially spaced tapped portions having similar threads, and an internally recessed portion forming a bellows-like resilient portion intermediate the tapped portions and normally holding the tapped portions with the threads thereof out of phase, the resilient portion being axially expansible and disposed about the axis to provide a substantially uniform axial resiliency and including integral, axially spaced, outwardly extending wall sections and an arcuate wall section at the outer end of the outwardly extending wall sections, the wall sections being arranged to partake of a bending action upon axial expansion and contraction of the resilient portion and being characterized by the metal thereof being less than that required for a threaded portion.

6. A lock nut of the type described comprising in combination three portions including two axially spaced tapped portions having similar threads, and a resilient portion uniting the tapped portions with the threads thereof out of phase, the resilient portion being axially expansible, disposed about the axis of the nut to provide a substantially uniform axial resiliency and including a wall section arranged to partake of a bending action upon axial expansion and contraction of the resilient portion, and the resilient portion being so proportioned that it may expand, under a force acting against the threads of the two tapped portions and without substantial damage to the threads, to an extent greater than the amount required to accommodate commercial thread tolerances.

RICHARD W. LUCE.